(12) United States Patent
Hejnicki

(10) Patent No.: US 7,654,059 B2
(45) Date of Patent: Feb. 2, 2010

(54) TRUSS CONNECTOR

(76) Inventor: Thomas L. Hejnicki, 4943 Statesville Dr., Toledo, OH (US) 43623

( * ) Notice: Subject to any disclaimer, the term of this patent is extended or adjusted under 35 U.S.C. 154(b) by 712 days.

(21) Appl. No.: 11/276,857

(22) Filed: Mar. 16, 2006

(65) Prior Publication Data

US 2007/0234676 A1   Oct. 11, 2007

(51) Int. Cl.
*E04H 12/18* (2006.01)
*E04B 1/00* (2006.01)
*E04C 5/08* (2006.01)

(52) U.S. Cl. .................. 52/750; 52/223.8; 52/223.9; 52/646; 52/655.1; 52/633

(58) Field of Classification Search .................. 52/750, 52/655.1, 633, 645, 646, 638, 656.9, 653.2, 52/568, 836, 845, 848, 223.5, 223.8–223.9; 403/150, 153–155, 157, 161, 164
See application file for complete search history.

(56) References Cited

U.S. PATENT DOCUMENTS

| | | | | |
|---|---|---|---|---|
| 2,658,776 | A * | 11/1953 | Wilcox | 52/653.2 |
| 3,861,107 | A * | 1/1975 | Papayoti | 52/654.1 |
| 3,914,063 | A * | 10/1975 | Papayoti | 403/217 |
| 4,666,344 | A * | 5/1987 | Seegmiller | 405/302.3 |
| 4,766,712 | A * | 8/1988 | Hale | 52/645 |
| 4,941,499 | A * | 7/1990 | Pelsue et al. | 135/125 |
| 4,982,546 | A * | 1/1991 | Lange | 52/655.1 |
| 5,090,166 | A * | 2/1992 | Johnson et al. | 52/167.3 |
| 5,390,463 | A * | 2/1995 | Sollner | 52/650.2 |
| 5,439,310 | A * | 8/1995 | Evenson et al. | 403/321 |
| 5,481,842 | A * | 1/1996 | Gautreau | 52/656.9 |
| 5,560,174 | A * | 10/1996 | Goto | 52/655.1 |
| 5,711,131 | A * | 1/1998 | Thomas | 52/656.9 |
| 5,797,695 | A * | 8/1998 | Prusmack | 403/170 |
| 6,079,178 | A * | 6/2000 | Fisher | 52/690 |
| 6,378,265 | B1 * | 4/2002 | Konstandt | 52/655.2 |
| 6,408,587 | B2 * | 6/2002 | Cronin et al. | 52/637 |
| 6,523,320 | B2 * | 2/2003 | Stoof | 52/651.05 |
| 6,634,823 | B2 * | 10/2003 | Sciortino | 403/13 |
| 6,675,546 | B2 * | 1/2004 | Coles | 52/655.1 |
| 6,854,238 | B2 * | 2/2005 | Boots | 52/655.1 |
| 7,380,373 | B2 * | 6/2008 | Crookston | 52/127.5 |
| 2004/0226258 | A1* | 11/2004 | Zingerman | 52/749.11 |
| 2005/0210767 | A1* | 9/2005 | DeFever et al. | 52/80.1 |
| 2006/0096228 | A1* | 5/2006 | Chen | 52/633 |

* cited by examiner

*Primary Examiner*—Richard E Chilcot, Jr.
*Assistant Examiner*—Mark R Wendell
(74) *Attorney, Agent, or Firm*—Invention Protection Associates, LLC

(57) ABSTRACT

A truss connector for releasably coupling ends of truss structures in a quick and uniform fashion. The connector connects trusses, end-to-end, by binding to their tubular truss members in spigot fashion with an arbor, traveling nut and expandable collet assembly and by binding to the truss gusset plates in a directly fastened, mated plate assembly.

18 Claims, 4 Drawing Sheets

TRUSS CONNECTOR

BACKGROUND OF THE INVENTION

The present invention generally relates to a mechanical device for releasably coupling truss structures and is specifically directed to an apparatus adapted to simultaneously join, with complete and uniform rigidity, the aligned ends of chord members of trusses, particularly trusses of the types commonly used to erect temporary entertainment stage environments.

Truss structures are staple equipment of entertainment industry productions. Music concerts, theatrical shows and other types of outdoors spectator events typically require stage platforms upon which the performances take place, elevated light fixtures and sound speakers to hover about the stage and inclined areas for the audiences to sit and view the performances. Normally, multiple truss sections are assembled to form structures for supporting the stage and retractable bleachers and for suspending speakers and lights. Obviously, the types of trusses used are selected for their ability to support loads that they are likely to experience. It is, therefore, imperative that any connectors used to join these trusses together be able to withstand any static and dynamic loads that they may be subjected to and that the connectors not be likely failure points along the assembled truss structures. Furthermore, where the stage environment may require quick reconfiguration, such as may be necessary during intermission of a multi-act concert, it is equally vital that the truss connectors lend themselves to rapid assembly and disassembly of trusses sections.

There are several varieties of truss connectors of the prior art adapted to facilitate relatively quick releasable coupling of the terminal ends of truss sections. Some such truss connectors feature forked configurations that allow chord members of adjacent truss sections to be joined at their aligned ends. For example, U.S. Pat. No. 6,675,546 to Coles discloses a connector comprising a male member and a forked female member, both having distal ends which are to be inserted into the ends of adjacent truss chord members and then secured to those chord members with cotter pins that are inserted into aligned holes residing in the connector members and truss chord members, and wherein the connector's male member is to be inserted into the forked female member and secured thereto with a clevis pin, thereby hingedly fastening the adjacent truss chord members together. However, while the connector disclosed in the Coles patent may be an effective truss coupling means, it, like many other truss connectors of the prior art, may have a particular vulnerability. Specifically, pins used to fasten components are subjected to shear when loads acting upon the connector-joined trusses pull the trusses away from each other.

U.S. Pat. No. 5,711,131 to Thomas discloses a truss also having connectors of forked configurations. More specifically, the Thomas connector features forked limbs with co-axial holes—allowing the limbs to be bolted to those of another connector—and a spigot to be inserted into a tubular truss member. Rather than using pins or bolts to secure the connector to the truss, the spigot is welded to the truss member that it is disposed within. However, because the forked connectors disclosed in Thomas are irremovable from the truss members that they are welded to, these trusses can be incompatible for coupling with other trusses that do not employ the same connector parts.

U.S. Pat. No. 6,634,823 to Sciortino discloses another style of truss connector comprising left and right shell pieces that are fitted over opposite sides of abutting truss member ends and then are screwed and bolted to those truss members. However, similar to the Coles connector, the configuration of the Sciortino apparatus renders its securing bolts and screws susceptible to failure due to shearing forces that may be induced by dynamic loads on the connected truss sections. Moreover, virtually all tube-to-tube truss connecting devices of the prior art of which the present inventor is aware, whatever their unique configurations, require their users to manually secure each joining of truss members one joint at a time. For example, when two truss sections are to be coupled at the ends of their four respective chord members, one normally must undertake piecemeal installation of four separate connector devices in order to secure each of the four chord member couplings. Obviously, when a great number of truss sections must be assembled, installing the necessary number of truss connectors can be a tedious, time consuming proposition. Furthermore, in circumstances where there is minimal time to perform such assembly work (ex: between concert acts), this realization could induce operations personnel, in their hast, to make mistakes relative to properly securing each truss member coupling and, consequently, cause the overall truss assembly to be structurally unsound.

Therefore, it can be appreciated that there exists a need for a truss connector apparatus that is adapted to: (a) facilitate more rigid and secure assembling of trusses and (b) allow the multiple aligned ends of chord members of separate truss sections to be coupled simultaneously for the purpose of reducing the work time associated with properly connecting trusses. The truss connector of the present invention substantially fulfills this existing need.

SUMMARY

The present invention is a mechanical device for more rigidly and time efficiently joining sections of truss. Its inventor contemplates the device being used, specifically, to join the types of truss sections commonly used in entertainment productions for assembling truss-supported stage environments. Typically, such types of truss have, at their ends, gusset plates lying perpendicular to the axes along which their chord members run. The gusset plates feature holes that allow truss sections to be mated end-to-end and bolted together at their respective gussets. Nevertheless, various truss connectors of the prior art are often used to also bind together separate truss sections at the meetings of the ends of their respective chord members. The truss connector of the present invention is adapted for both binding together the gusset plates of separate trusses as well as engaging, in spigot fashion, their axially aligned chord members in a manner that uniformly joins trusses and further minimizes the possibility of truss connection failure.

A preferred embodiment of the present invention comprises several components including: a pair of parallel-spaced, substantially rectangular connector plates; plate spacers sandwiched between and attached to the connector plates; 4 long differential screws traversing co-axial bores in both connector plates, the screws having traveling collet nuts threaded onto their ends; 2 arbors affixed to each screw (8 total arbors); 2 expandable collets along each screw (8 total collets), the collets being tapered on each end to match tapers of both the arbors and the traveling nuts; and a gear system stationed between the two connector plates.

The connector plates function as surfaces for mating with and binding to truss gusset plates. Each combination of differential screw, arbor, collet nut and collet acts as an inserting member for being inserting into and binding to tubular truss members. The gear system functions as a means for driving the collet nuts to and fro along the differential screws, and it comprises: a drive gear mounted upon a drive shaft fixed between the aligned centers of the connector plates; 4 idler gears that are stationed symmetrically about, are engaged to and are rotatably driven by the drive gear; and 4 screw gears, each screw gear being mounted upon the center of an differential screw and rotatably driven by an idler gear.

With the present connector, a user can secure a uniform, rigid joining of two trusses by simply executing the three successive steps of: (1) slip fitting both trusses' members' ends over the arbors such that the gusset plate of the first truss is flush against one connector plate and that of the second truss is flush against the opposite connector plate; (2) turning the drive gear to actuate the collet nuts and propel them into the collets and, in turn, wedge the collets over the tapered arbors in order to cause radial expansion of the collets and, consequently, to friction bind the expanded collets to the interior walls of the several truss members; and (3) bolting the gusset plates to the connector plates.

It is, therefore, an object of the present invention to provide a truss connector apparatus that more rigidly binds truss sections together while effectively reducing the likelihood of connection failure due to shearing of the connector's fastening components. The present connector facilitates binding of trusses at their respective gusset plates as well as directly connecting their aligned chord members to achieve an overall connection of greatest yield strength. This is particularly beneficial for use in entertainment industry truss structures considering that loading moments about truss connections within such truss structures can greatly vary as dynamic loads are applied to the structures.

Another object of the present invention is to provide a truss connector apparatus that lends itself to reducing the amount of time normally consumed by the process of applying connector devices to join trusses. Virtually all of the instant connector's components remain integrated within a single physical apparatus. Therefore, the present connector enables a single user to simultaneously secure multiple connections of axially aligned truss member pairings without, as is traditionally required, having to manipulate separate connecting devices which must be applied to each of those pairings.

Finally, it is yet another object of the present invention to provide a truss connector that facilitates a more uniform binding of truss member ends. By employing a system of integrated gears to uniformly push the collets into the arbors and thereby create uniformly applied binding pressure on all the tubular truss members inside which the expanded collets are disposed, use of the present connector greatly reduces the likelihood that the interconnections of some truss member pairings will be more or less rigid than are other pairings, as can occur when using connectors of the prior art which must be individually applied to each such truss member pairing.

Although the present invention has been described in considerable detail and with reference to and illustration of a preferred version and reference to various alternative embodiments, it should be understood that other versions are contemplated as being a part of the present invention.

DETAILED DESCRIPTION OF THE PREFERRED EMBODIMENTS

Figure 1:
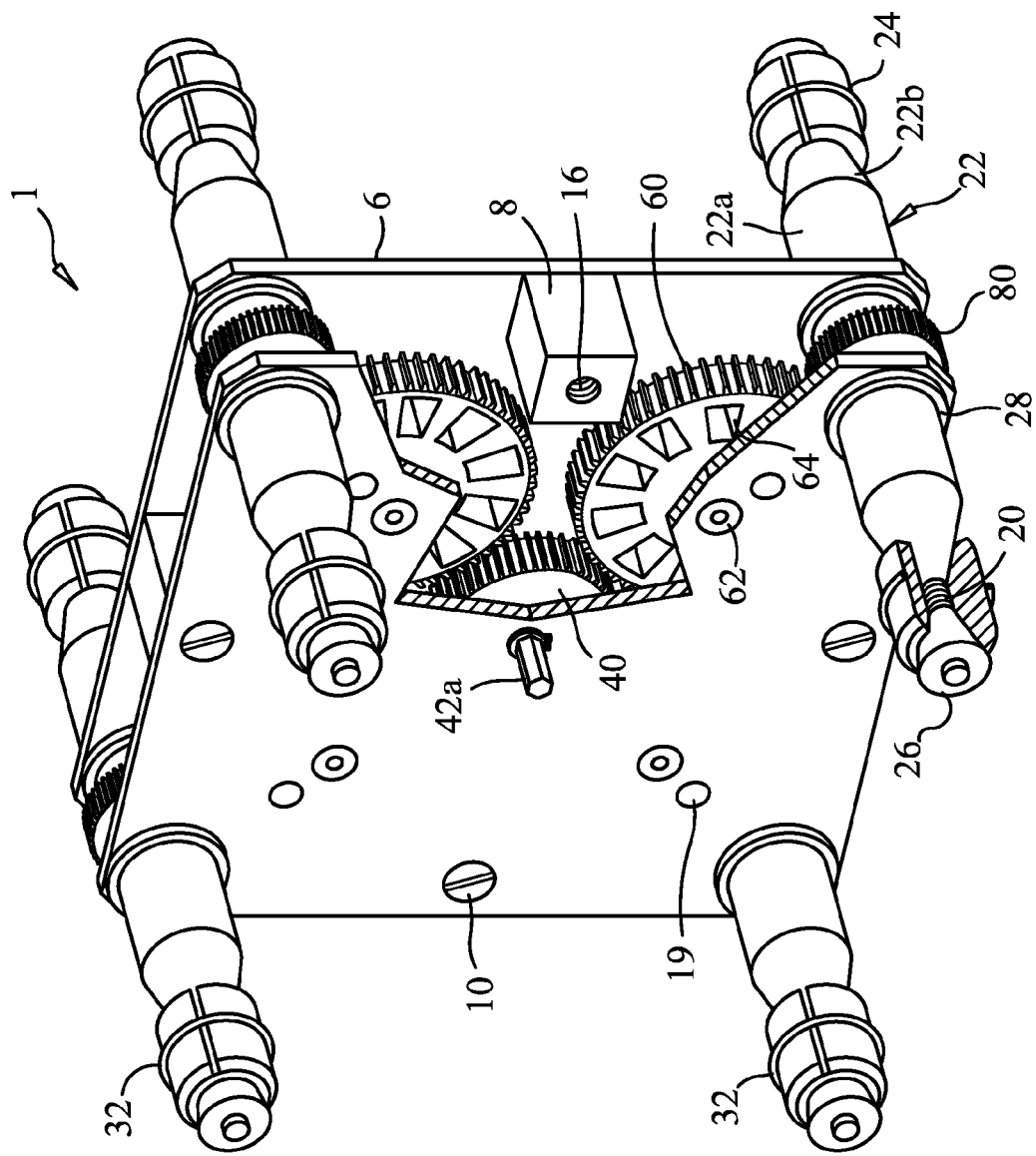
FIG. 1 is a perspective view of the truss connector of the present invention with a connector plate and collet shown in partial cross-section.

The truss connector apparatus 1 of the present invention employs several integrated components. FIG. 1 illustrates a preferred embodiment of the invention—an embodiment whose fully integrated major components include: a pair of generally rectangular connector plates 6, four long differential screws 20, four pairs of arbors 22, four pairs of collets 24, four pairs of collet nuts 26, a drive gear 40, four idler gears 60 and four screw gears 80. The illustrated embodiment of the connector 1 is adapted for connecting pairs of trusses having four chord members. However, alternative embodiments for connecting trusses of two, three or more than four members are contemplated as well. For instance, an embodiment designed to couple three-membered trusses could comprise triangular connector plates 6 with just three differential screws 20 and three screw gears 80. Further, the three screw gears 80 could be meshed to three idler gears 60 that triangulate the drive gear 40.

Nevertheless, in a preferred embodiment of the instant connector 1, the connector plates 6 are removably attached to one another in spaced, parallel, latitudinal planes via a set of cubic plate spacers 8 which are sandwiched between and screwed to both connector plates 6. More, specifically, each spacer 8 has longitudinal oriented grooves 16 for receiving a pair of plate screws 10 that are inserted through the connector plates' aligned screw holes 12 and tightened into those grooves 16, thereby fastening both plates 6 to the spacers 8 and to each other. However, while the connector plates 6 of the illustrated and preferred embodiment are removably fastened to the spacers 8, in alternative embodiments of the invention, the connector plates 6 may be welded, riveted or otherwise permanently affixed to spacing columns.

The single drive gear 40 is fixedly mounted on a rotating drive shaft 42 that is perpendicular to and centered between the connector plates 6. In the preferred embodiment of the connector 1, the drive shaft is hexagonal and protrudes through one of the connector plates, allowing it to be manually turned using a socket wrench 300. The four idler gears 60 are spoked gears that symmetrically surround the drive gear 40 with their respective gear teeth engaging those of the drive gear 40. The idler gears 60 are rotatably mounted on idler shafts 62 which are affixed to the connector plates 6 at the idler shafts' ends. Therefore, in addition to being a means for spacing the connector plates 6 such that the various meshed gears can be housed between the plates 6, the spacers 8 prevent the drive shaft 42 and the idler shafts 62 from bearing the full brunt of compressive forces that the shafts 42, 62 and spacers 8 may be subjected to from time to time when the connector 1 is installed on trusses. The four screw gears 80 are fixedly mounted upon the centers of the differential screws 20, and each screw gear 80 is engaged to its nearest idler gear 60.

The differential screws 20 run longitudinally through co-axial bores 18 in the connector plates 6. The bores 18 are located generally near the four corners of each connector plate 6, and they are positioned to axially align with truss member ends that the particular embodiment of the connector 1 is designed and dimensioned to join.

Along each screw 20, positioned closer to the connector plates 6, are pairs of arbors 22. Arbors 22 comprise a tubular section 22a and a generally conical tapered section 22b, and they are oriented such that the ends of their tubular sections 22a face the nearest connector plate 6. The arbors 22 function as spigots, as an arbor's tubular section 22a has an external diameter that makes the arbor 22 a push fit inside a truss member. Preventing the arbors 22 from sliding within the larger diametered bores 18 are washers 28 sandwiched between the ends of the arbors' tubular sections 22a and the connector plates 6.

Toward the ends of the differential screws 20 are traveling collet nuts 26, and positioned between the arbors 22 and collet nuts 26, are collets 24. The collets 24 are shaped to wedge over both their adjacent arbors' tapered sections 22b as well as the collet nuts 26. Circumscribing each collet 24 is an O-ring 32 which applies compressive force to the middle of the collet 24 and further facilitates the wedging.

Finally, at both ends of the differential screws 20 are welded-on retaining rings 30 or some other retaining parts for preventing the adjacent collet nuts 26 from traveling off the screws.

Figure 2:
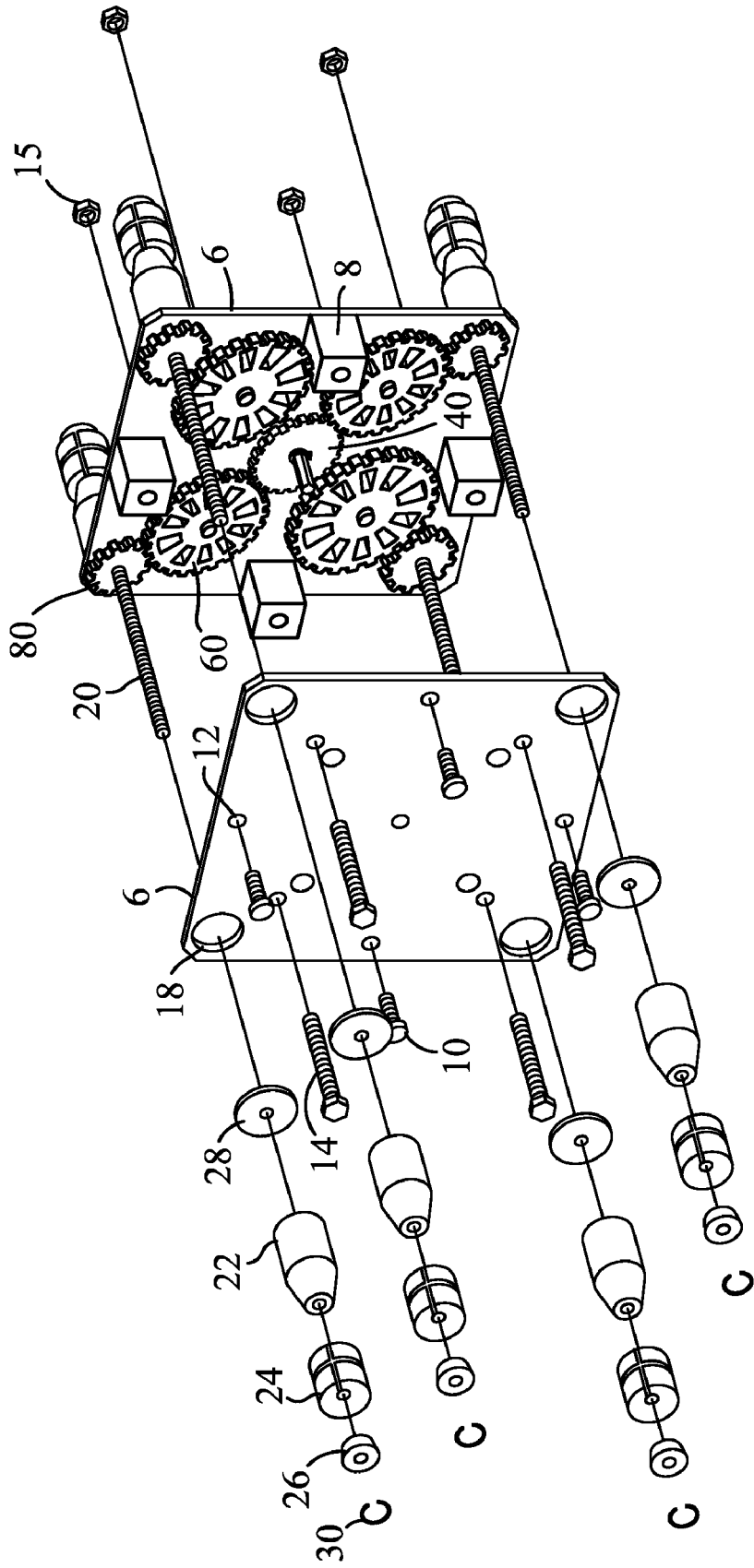
FIG. 2 is a perspective view of the connector in a partially disassembled state.
Figure 3:
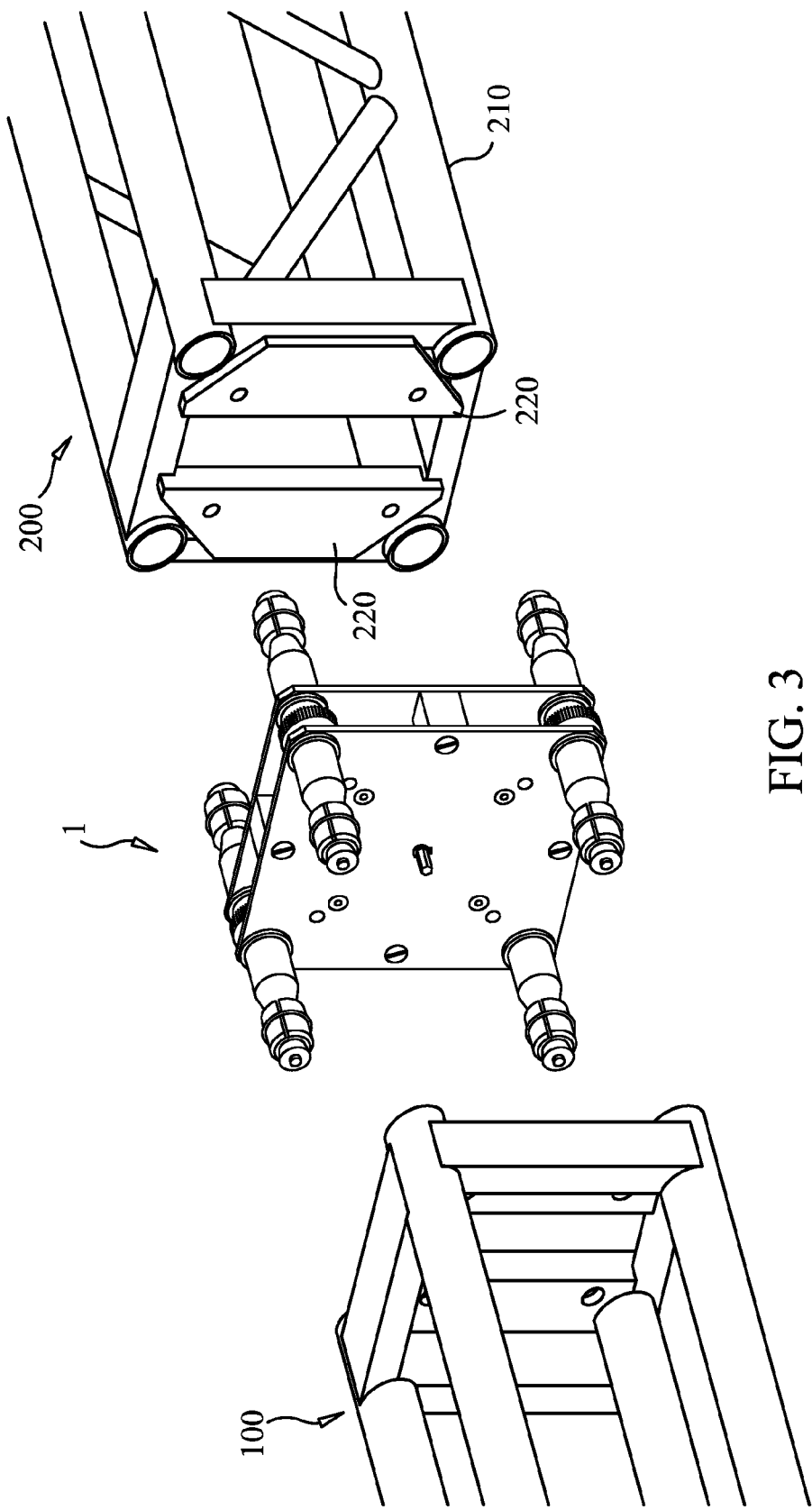
FIG. 3 is a perspective view of the connector just prior to coupling two trusses.

As shown in FIG. 2, the connector 1 joins separate truss sections 100,200 at their ends by binding itself to their respective chord members and gusset plates. The four longitudinal, tubular members 110 of a first truss 100 are slid over the segments of the differential screws 20 that extend longitudinally from one side of the latitudinal connector plates 6 such that: (i) the four ends of the truss members 110 meet the four washers 28 abutting the connector plate 6 residing on that side of the gear system and (ii) the latitudinal gusset plate 120 of the first truss 100 presses flush against that connector plate 6. The identical four members 210 of a second truss 200 are fitted over the opposite sides of the differential screws 20 in likewise fashion. Therefore, in addition to covering the segments of the screws 20 that span outside the latitude of the connector plates 6, the truss members 110,210 fit over the arbors 22, collets 24 and collet nuts 26 along those screw segments. The clearances between the inner walls of the tubular truss members 110,210 and the tubular sections of the arbors 22 make the arbors 22 a push fit.

Figure 4:
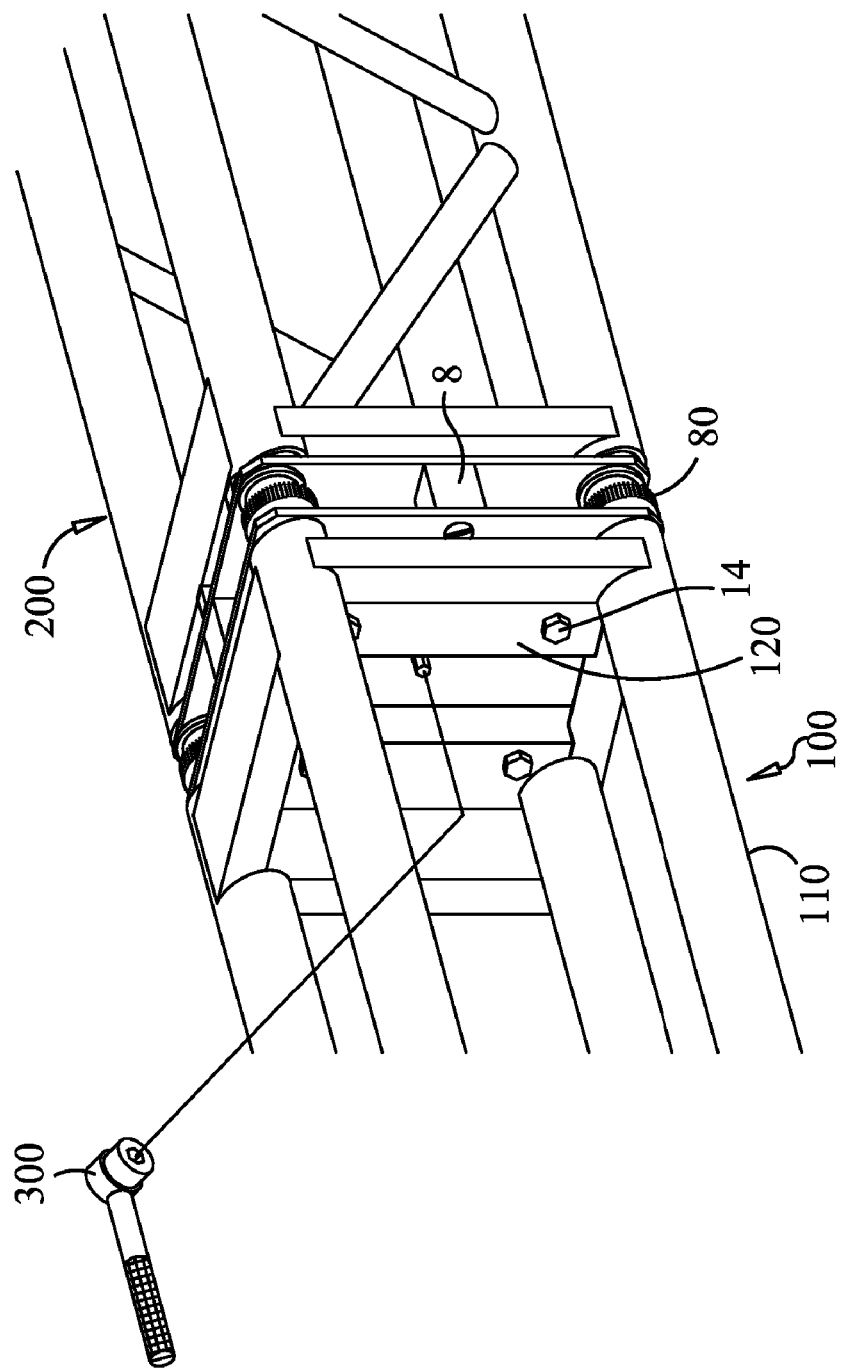
FIG. 4 is a perspective view of two trusses being coupled by the connector.

Once the differential screws 20 and their accompanying parts are properly disposed within the truss members 110, 210, a user partially secures connection of the two trusses 100,200 by actuating the collet nuts 26. More specifically, as indicated by FIG. 4, the user places a socket wrench 300 over the drive shaft's longitudinal extension 42a, and he turns the shaft 42 and drive gear 40 clockwise. Rotation of the drive gear 40 initiates rotation of the screw gears 80 and, therefore, of the differential screws 20 and parts mounted on the screws 20. However, due to friction that exists between the abutting collet nuts 26 and collets 24, the collet nuts 26 are inhibited from rotating with the screws 20 and, instead, are drawn along the screws 20.

Furthermore, because the screws 20 are differential screws, each collet nut 26 is drawn inward, pressing the adjacent collet 24 against an arbor 22. As the differential screws 20 further rotate, the collet nuts 26 wedge under one end of the collets 24, and the collets 24 wedge over the arbors' tapered sections 22b. This wedging action causes the collets 24 to radially expand and friction bind themselves to the interior walls of the truss members 110,210. Once the collets 24 are sufficiently bound to the truss members 110,210, the user can discontinue turning the drive shaft 42 and then finish securing the truss connection by directly binding the trusses' gusset plates 120,220 to the connector 1.

With the gusset plate 120 of the first truss 100 mated flush against one connector plate 6 and the gusset plate 220 of the second truss 200 flush against the other connector plate 6, the gusset plates 120,220 can be bolted to the connector plates 6. Specifically, four bolts 14 are inserted through the co-axial bolt holes 19 residing in the gusset plates 120,220 and connector plates 6, and nuts 15 are tightened onto the bolts 14. Also, because the inserted bolts 14 each pass between spokes 64 of an idler gear 62, they act as gear stopping devices by preventing reverse rotation of the connector's gears. This effectively locks each of the collets 24 in their expanded states.

Although the present invention has been described in considerable detail and with reference to and illustration of a preferred version, it should be understood that other versions, which are not illustrated, are contemplated as being a part of the present invention.

For example, rather than (or in addition to) the idler gears 60 being spoked, the drive gear 40 may be spoked to allow a key, bolt of other form of longitudinal stopping member to be inserted between the drive gear's spokes in order to prevent gear rotation.

For another example, rather than being adapted for rotation by a socket wrench, the drive shaft 42 may be shorter and feature a hexagonal socket, enabling the shaft 42 to be rotated by an Allen wrench.

For another example, rather than employing detachable spacers 8 or permanent columns to space the connector plates 6, a perimeter wall can join the edges of the connector plates 6 to form an enclosure around the various gears that protects them from the environment.

What is claimed is:

1. A truss connector comprising:
   at least one mating surface;
   means for fastening the at least one mating surface to gusset plates found at the ends of trusses; and
   inserting members extending from the at least one mating surface, the inserting members for inserting into ends of truss members, wherein the inserting members comprise:
   screws;
   arbors along the screws;
   collets along the screws, wherein the collets are adapted to wedge against the arbors; and
   traveling nuts along the screws, wherein travel of the traveling nuts axially along the screws causes the collets to wedge against the arbors and that wedging action causes the collets to radially expand and bind against the interior walls of the truss members.

2. The truss connector of claim 1, further comprising spacers that join multiple said mating surfaces in separate planes.

3. The truss connector of claim 1, wherein said fastening means comprises at least one bolt and nut assembly.

4. The truss connector of claim 1, further comprising retaining parts for preventing said traveling nuts from traveling off of said screws.

5. The truss connector of claim 1, wherein said screws are differential screws.

6. The truss connector of claim 1, further comprising actuation means for moving said traveling nuts axially along said screws.

7. The truss connector of claim 6, further comprising a weatherproof housing inside which said actuation means is disposed.

8. The truss connector of claim 6, wherein said actuation means comprises:
   a drive gear;
   idler gears rotatably driven by the drive gear; and
   screw gears rotatably driven by the idler gears, wherein the screw gears are fixedly mounted on said screws, wherein rotation of the drive gear in one direction causes the traveling nut along each screw to move toward the arbor along that screw, and rotation of the drive gear in the opposite direction causes those traveling nuts to move away from those arbors.

9. The truss connector of claim 8, wherein at least one of said drive and idler gears is spoked, and wherein a stopping member may be inserted between spokes of the at least one spoked gear to prevent further gear rotation.

10. The truss connector of claim 6, wherein said actuation means comprises:
   a drive gear; and
   screw gears rotatably driven by the drive gear, wherein the screw gears are fixedly mounted on said screws, wherein rotation of the drive gear in one direction causes the traveling nut along each screw to move toward the arbor along that screw, and rotation of the drive gear in the opposite direction causes those traveling nuts to move away from those arbors.

11. The truss connector of claim 10, wherein said drive gear is spoked and wherein a stopping member may be inserted between spokes of said drive gear to prevent further gear rotation.

12. A truss connector comprising:
   at least one mating surface;
   means for fastening the at least one mating surface to gusset plates found at the ends of trusses;
   radially expandable inserting members extending from the at least one mating surface, the inserting members for inserting into ends of truss members; and
   actuation means for causing the inserting members to radially expand and bind against interior walls of truss members.

13. The truss connector of claim 12, further comprising spacers that join multiple said mating surfaces in separate planes.

14. The truss connector of claim 12, wherein said fastening means comprises at least one bolt and nut assembly.

15. The truss connector of claim 12, wherein said actuation means comprises:
   a drive gear;
   idler gears rotatably driven by the drive gear; and
   screw gears rotatably driven by the idler gears, wherein rotation of the drive gear in one direction causes said inserting members to radially expand.

16. The truss connector of claim 15, wherein at least one of said drive and idler gears is spoked, and wherein a stopping member may be inserted between spokes of the at least one spoked gear to prevent further gear rotation.

17. The truss connector of claim 12, wherein said actuation means comprises:
   a drive gear; and
   screw gears rotatably driven by the drive gear, wherein rotation of the drive gear in one direction causes said inserting members to radially expand.

18. The truss connector of claim 17, wherein said drive gear is spoked and wherein a stopping member may be inserted between spokes of said drive gear to prevent further gear rotation.

* * * * *